United States Patent
Tamaoki

(10) Patent No.: US 12,351,117 B2
(45) Date of Patent: Jul. 8, 2025

(54) POWER SUPPLY CONTROL APPARATUS

(71) Applicant: TOYOTA JIDOSHA KABUSHIKI KAISHA, Toyota (JP)

(72) Inventor: Tomoyasu Tamaoki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 18/239,516

(22) Filed: Aug. 29, 2023

(65) Prior Publication Data

US 2024/0075890 A1 Mar. 7, 2024

(30) Foreign Application Priority Data

Sep. 1, 2022 (JP) .................................. 2022-139074

(51) Int. Cl.
*B60R 16/023* (2006.01)
*B60W 50/02* (2012.01)

(52) U.S. Cl.
CPC ..... *B60R 16/0234* (2013.01); *B60W 50/0205* (2013.01); *B60W 50/0225* (2013.01); *B60W 2050/0215* (2013.01); *B60W 2520/06* (2013.01); *B60W 2520/10* (2013.01)

(58) Field of Classification Search
CPC .......... B60R 16/0234; B60W 50/0205; B60W 50/0225; B60W 2050/0215; B60W 2520/06; B60W 2520/10
See application file for complete search history.

(56) References Cited

U.S. PATENT DOCUMENTS

| | | | |
|---|---|---|---|
| 2005/0085967 A1* | 4/2005 | Mitsueda | F02D 41/22 714/E11.004 |
| 2014/0100726 A1* | 4/2014 | Reynolds | B60W 20/50 903/930 |
| 2017/0308095 A1* | 10/2017 | Irion | G08G 1/146 |
| 2018/0050704 A1* | 2/2018 | Tascione | G07C 5/0808 |
| 2019/0187701 A1* | 6/2019 | Zheng | B60W 60/0057 |
| 2020/0304712 A1* | 9/2020 | Kimura | H04N 23/65 |
| 2020/0334762 A1* | 10/2020 | Carver | G07C 5/0825 |
| 2022/0258751 A1* | 8/2022 | Dane | H04W 4/48 |
| 2022/0261307 A1* | 8/2022 | Kimura | G06F 11/0739 |
| 2022/0278737 A1* | 9/2022 | Vejlgaard | H04B 7/0482 |
| 2022/0306085 A1* | 9/2022 | Ito | B60W 30/06 |
| 2023/0028289 A1* | 1/2023 | Tschiskale | B60W 50/06 |
| 2024/0025451 A1* | 1/2024 | Grace | B60W 30/165 |

FOREIGN PATENT DOCUMENTS

JP 2020-156222 A 9/2020

\* cited by examiner

*Primary Examiner* — Sihar A Karwan
(74) *Attorney, Agent, or Firm* — Dinsmore & Shohl LLP

(57) ABSTRACT

The power supply control apparatus performs power supply control of a sensor used in the driving support apparatus. The power supply control apparatus comprises a power supply control unit. The power supply control unit performs power supply reset of a plurality of sensors when it is determined that one of the driving support functions other than one of the driving support functions using a malfunctioning sensor is in inoperative. The power supply control unit does not perform power supply reset of the plurality of sensors when it is determined that one of the driving support functions other than one of the driving support functions using the malfunctioning sensor is operative.

4 Claims, 2 Drawing Sheets

POWER SUPPLY CONTROL APPARATUS

CROSS-REFERENCE TO RELATED APPLICATIONS

This application is based upon and claims the benefit of priority from Japanese Patent Application No. 2022-139074, filed on Sep. 1, 2022. The entire contents of which are incorporated herein by reference.

TECHNICAL FIELD

The present disclosure relates to a power supply control apparatus that performs power supply control of a sensor of a driving support apparatus.

BACKGROUND

There is a driving support apparatus for performing various kinds of driving support for a vehicle. The driving support apparatus performs driving support based on detection results of various sensors that detect an external situation or the like of a vehicle. In such a sensor, the detection may fail. Therefore, for example, JP 2020-156222 A describes that the power supply of the sensor is reset. The resetting of the power supply means temporarily cutting off the power supply to the sensor and supplying the power again.

SUMMARY

For example, the driving support apparatus performs a plurality of driving support functions based on a detection result of at least one of the plurality of sensors. In this case, in order to prepare for power supply reset performed when the sensor malfunctions, it is conceivable to provide a switch that switches between supply and cutoff of power to the sensor. From the viewpoint of reducing the number of switches, a common switch (one switch) may be provided for a plurality of sensors. However, when the common switch is used, the power supply to sensors other than a malfunctioning sensor is temporarily cut off. Therefore, it is considered that one of the driving support functions executed by using the detection result of the sensor does not function.

The present disclosure describes a power supply control apparatus capable of suppressing an effect on the driving support functions during operation when power supply reset of a plurality of sensors is performed.

A power supply control apparatus according to an aspect of the present disclosure performs power supply control of a sensor used in a driving support apparatus that performs each of a plurality of driving support functions for a vehicle based on at least one detection result of the plurality of sensors. The power supply control apparatus includes: a malfunction determination unit configured to determine a malfunctioning sensor among the plurality of sensors, the malfunctioning sensor being a sensor whose detection is malfunctioning; an operation determination unit configured to determine whether any of the driving support functions other than one of the driving support functions using the malfunctioning sensor are inoperative in the driving support apparatus; and a power supply control unit configured to perform a power supply reset of the plurality of sensors when one of the driving support functions other than one of the driving support functions using the malfunctioning sensor are determined as being inoperative, and not to perform a power supply reset of the plurality of sensors when one of the driving support functions other than one of the driving support functions using the malfunctioning sensor is determined as being operative.

In the power supply control apparatus, the power supply control unit may perform the power supply reset of the plurality of sensors based on at least one of a vehicle speed and a traveling direction of the vehicle in addition to whether any of the driving support functions other than one of the driving support functions using the malfunctioning sensor are inoperative or operative.

The malfunctioning sensor is a sensor that detects a situation in front of the vehicle. The inoperative driving support function determined by the operation determination unit is one of the driving support functions to be performed based on a situation behind the vehicle. The vehicle is moving forward at a vehicle speed greater than or equal to a predetermined forward vehicle speed threshold. In this case, the power supply control unit in the power supply control apparatus may perform power supply reset of the plurality of sensors.

The malfunctioning sensor is a sensor that detects a situation behind the vehicle. The inoperative driving support function determined by the operation determination unit is one of the driving support functions to be performed based on a situation in front of the vehicle. The vehicle is moving backward at a vehicle speed equal to or higher than a predetermined reverse vehicle speed threshold. In this case, the power supply control unit in the power supply control apparatus may perform power supply reset of the plurality of sensors.

According to an aspect of the present disclosure, when power supply reset of a plurality of sensors is performed, it is possible to suppress an effect on driving support functions during operation.

DETAILED DESCRIPTION

In the following description, with reference to the drawings, the same reference numbers are assigned to the same components or to similar components having the same function, and overlapping description is omitted.

Figure 1:
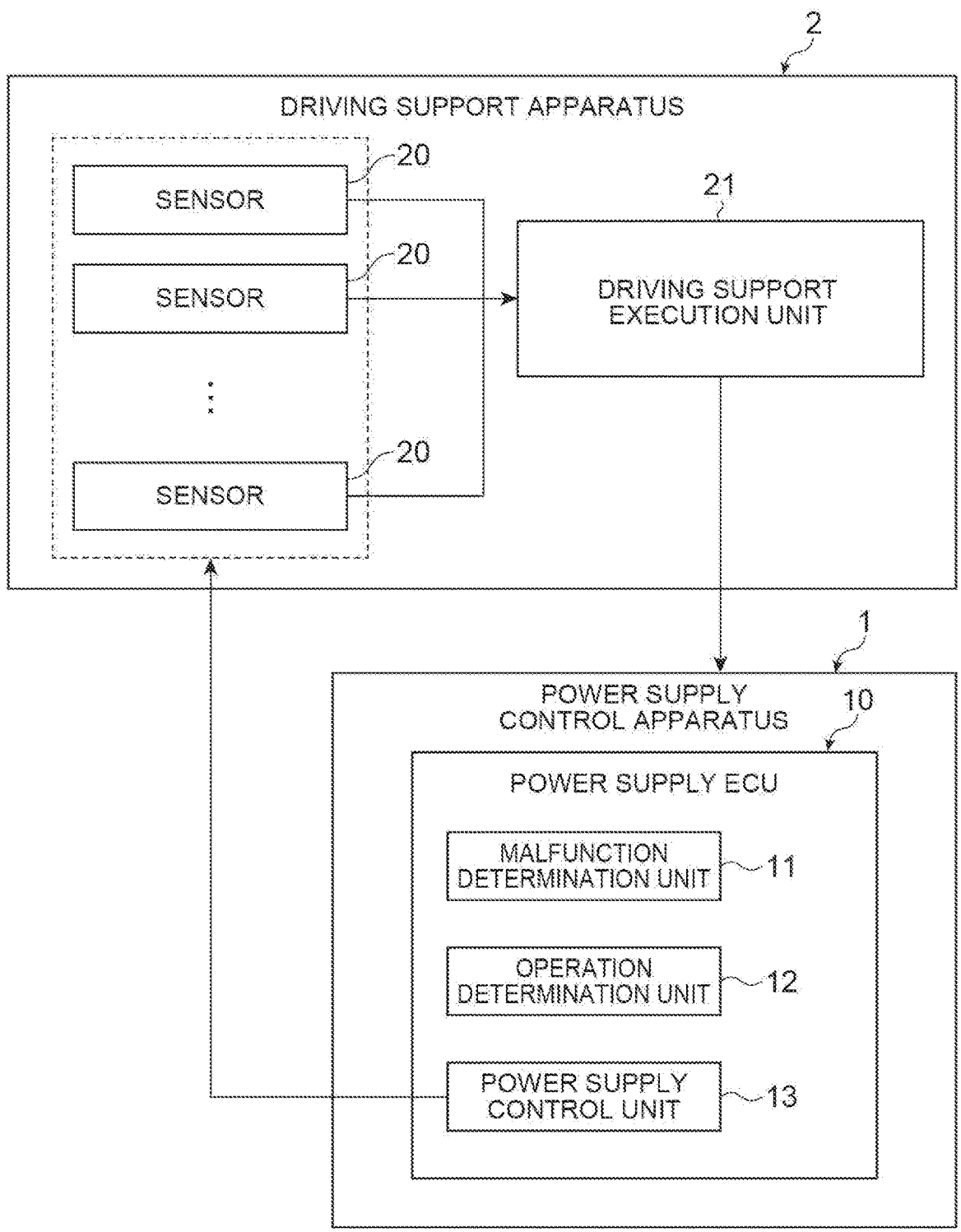
FIG. 1 is a block diagram showing an example of a power supply control apparatus according to an embodiment.

A power supply control apparatus 1 shown in FIG. 1 performs power supply control of a plurality of sensors 20 used in a driving support apparatus 2 performing various driving support functions for a vehicle. The sensors 20 detect various conditions used to perform the driving support functions, such as an external situation of a vehicle. The plurality of sensors 20 are provided. A driving support execution unit 21 provided in the driving support apparatus 2 executes each of a plurality of driving support functions based on at least one detection result of the plurality of sensors 20.

The driving support apparatus 2 may assist driving of the vehicle in autonomous driving. The driving support apparatus 2 may assist driving of the vehicle in manual driving by the driver. The driving support apparatus 2 may be mounted on, for example, an autonomous driving vehicle capable of autonomous driving according to a situation. The driving support apparatus 2 may be mounted on a manually driven vehicle in which a driver performs driving operations.

The driving support functions may include, for example, confirmation of a situation around the vehicle. The driving support functions may include, for example, notifying the driver of an obstacle in response to an external situation of the vehicle. The driving support functions may include controlling driving of the vehicle in response to an external situation of the vehicle. In this way, the driving support functions include performing various controls and the like based on the detection result of the sensors 20.

As the sensors 20, various sensors can be used, such as a camera for imaging the surroundings of the vehicle, a driver monitor camera, a millimeter wave radar, a LIDAR (Light Detection and Ranging) and a sonar sensor. The camera may be a front camera, a rear camera, a side camera, or the like.

The power supply control apparatus 1 controls the supply of power from a power source (not shown) to the sensors 20 as power supply control of the sensors 20. The power supply control apparatus 1 includes a power supply ECU (Electronic Control Unit) 10. The power supply ECU 10 is an electronic control unit having a CPU (Central Processing Unit), ROM (Read Only Memory), RAM (Random Access Memory), and the like. For example, the operation unit 20 loads a program stored in the ROM into the RAM. The power supply ECU 10 realizes various functions by executing the program loaded into the RAM by the CPU.

The power supply ECU 10 is functionally equipped with a malfunction determination unit 11, an operation determination unit 12, and a power supply control unit 13. The malfunction determination unit 11 determines a malfunctioning sensor in the plurality of sensors 20, the malfunctioning sensor being one of the sensors 20 whose detection is malfunctioning. The case where the detection has failed may include, for example, a case where the detection cannot be performed. The case where the detection has failed may include a case where the detected value is abnormal. A detection failure may include, for example, the sensors 20 that can receive a detection signal from the sensors 20 but do not respond normally to signals or control instructions to the sensors 20.

The operation determination unit 12 can determine whether any of the plurality of driving support functions that can be executed by the power supply control apparatus 1 are operative and inoperative. The operation determination unit 12 determines whether any of the driving support functions other than one of the driving support functions using the malfunctioning sensor determined by the malfunction determination unit 11 are inoperative. It should be noted that the operation determination unit 12 knows in advance which of the sensors 20 is used to execute each of the driving support functions.

The power supply control unit 13 performs power supply reset of the plurality of sensors 20 based on the determination result of the operation determination unit 12. Here, the power supply reset means that the power supply to the sensors 20 is temporarily cut off to bring the sensors 20 into an inoperative state and the power supply is started again. In addition, the power supply control unit 13 collectively switches between supply and cutoff of power for the plurality of sensors 20. That is, when the power supply reset in the present embodiment is performed, only one power supply switch needs to be switched.

More specifically, the power supply control unit 13 performs power supply resets of the plurality of sensors 20 if it is determined that one of the driving support functions other than one of the driving support functions using the malfunctioning sensor in the operation determination unit 12 is inoperative. On the other hand, if it is determined that one of the driving support functions other than one of the driving support functions using the malfunctioning sensor is operative in the operation determination unit 12, the power supply control unit 13 does not perform power supply resets of the plurality of sensors 20.

Further, the power supply control unit 13 can perform the power supply reset of the plurality of sensors 20 based on at least one of the vehicle speed and the traveling direction of the vehicle in addition to whether any of the driving support functions other than one of the driving support functions using the malfunctioning sensor is inoperative or operative.

As a specific example, for example, the malfunctioning sensor is one of the sensors 20 that detects a situation in front of the vehicle. The inoperative driving support function determined by the operation determination unit 12 is one of the driving support functions to be executed based on the situation behind the vehicle. In this case, the power supply control unit 13 performs a power supply reset of the plurality of sensors 20 when the vehicle is moving forward at a vehicle speed greater than or equal to a predetermined forward vehicle speed threshold. On the other hand, if the vehicle speed is not equal to or greater than the predetermined forward vehicle speed threshold or the vehicle is not moving forward, the power supply control unit 13 does not perform the power supply reset of the sensors 20.

As another specific example, for example, the malfunctioning sensor is a sensor that detects a situation behind the vehicle. The inoperative driving support function determined by the operation determination unit 12 is one of the driving support functions to be executed based on the situation in front of the vehicle. In this case, the power supply control unit 13 executes the power supply reset of the plurality of sensors 20 when the vehicle is reversing at a vehicle speed equal to or greater than a predetermined reverse vehicle speed threshold. On the other hand, the power supply control unit 13 does not execute the power supply reset of the plurality of sensors 20 when the vehicle speed is not equal to or greater than the predetermined reverse vehicle speed threshold or when the vehicle is not moving backward.

Figure 2:
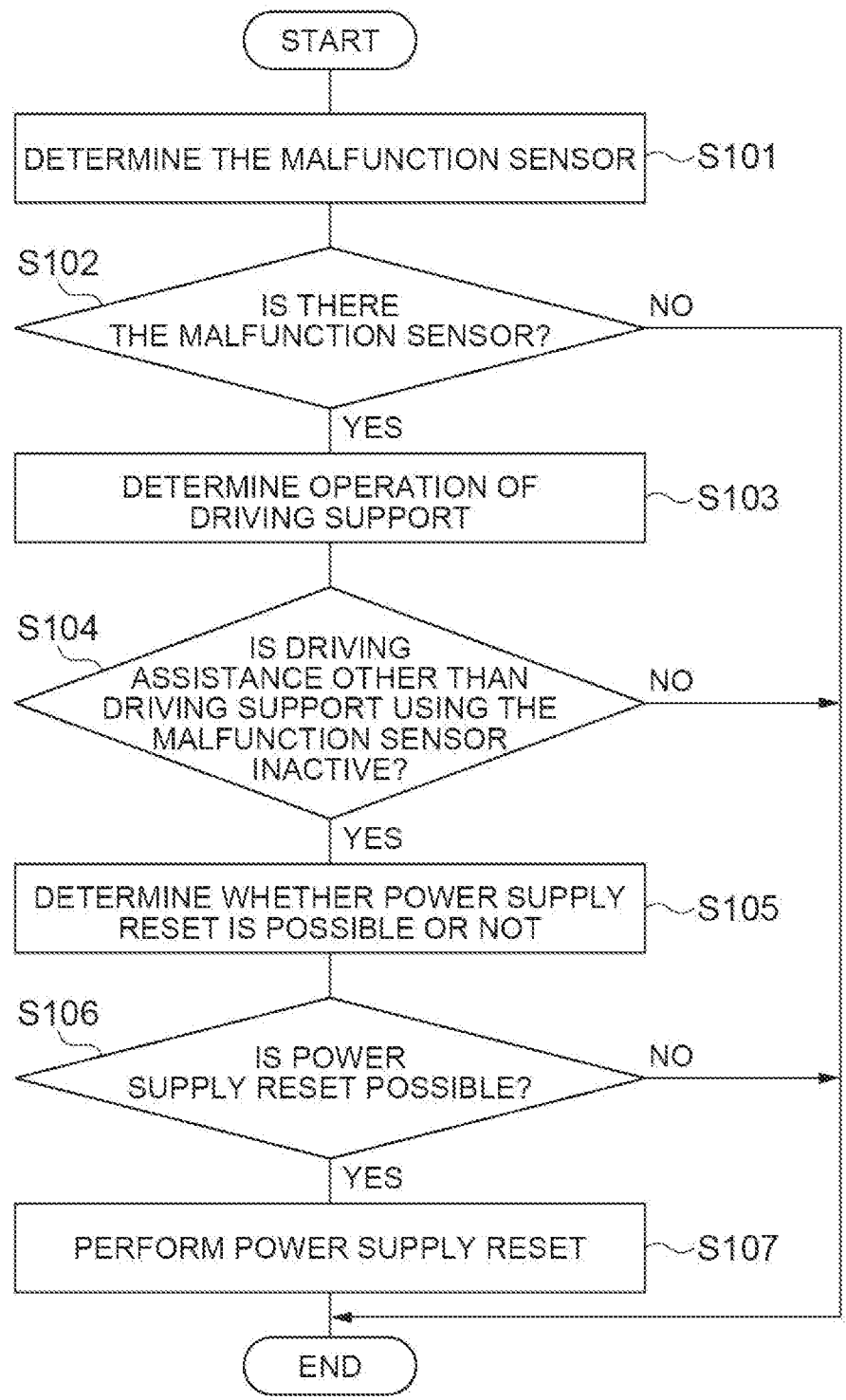
FIG. 2 is a flowchart showing the flow of the power supply reset process of the sensor performed in the power supply control apparatus.

Next, a flow of the power supply reset process of the sensors 20 performed in the power supply control apparatus 1 will be described with reference to a flowchart of FIG. 2. The process shown in FIG. 2 is performed when power is supplied to the sensors 20. Further, when the processing reaches the end, the processing is begun again from the start after a predetermined time.

As shown in FIG. 2, in the S101, the malfunction determination unit 11 determines a malfunctioning sensor that is detected among the plurality of sensors 20. If there is no malfunctioning sensor, the S102 is NO. In this case, the power supply ECU 10 ends the current process and begins the process again from the start after a predetermined time. On the other hand, if there is a malfunctioning sensor, the S102 is YES. In this case, the operation determination unit 12 in the S103 performs the driving support operation determination to be performed by the power supply control apparatus 1. Here, the operation determination unit 12 determines whether or not any of the driving support functions other than one of the driving support functions using the malfunctioning sensor determined in the S101 are inoperative. If one of the driving support functions other than one of the driving support functions using the malfunctioning sensor is not inoperative, the S104 will be NO. In this case, the power supply ECU 10 ends the current process and begins the process again from the start after a predetermined time.

If one of the driving support functions other than one of the driving support functions using the malfunctioning sensor is inoperative, the S104 is YES. In this case, the power supply control unit 13 in the S105 determines whether or not the power supply reset of the plurality of sensors 20 can be executed. Here, the power supply control unit 13 determines whether or not to execute the power supply reset based on at least one of the vehicle speed and the traveling direction of the vehicle in addition to whether or not any of the driving support functions other than one of the driving support functions using the malfunctioning sensor are inoperative or operative.

If power supply reset of the plurality of the sensors 20 cannot be performed, the S106 is NO. In this case, the power supply ECU 10 ends the current process and begins the process again from the start after a predetermined time. On the other hand, when power supply reset of the plurality of sensors 20 can be executed, S106 is YES. In this case, the power supply control unit 13 in the S107 performs power supply reset.

In a case where the vehicle speed and the traveling direction of the vehicle are not used when the power supply reset is executed, the above-described processing of S105 and S106 may not be executed.

As described above, when it is determined that one of the driving support functions other than one of the driving support functions using the malfunctioning sensor is inoperative, the power supply control apparatus 1 executes the power supply reset of the plurality of sensors 20. On the other hand, if one of the driving support functions other than one of the driving support functions using the malfunctioning sensor is operative, the power supply control apparatus 1 does not perform the power supply reset of the plurality of sensors 20. Here, it is considered that one of the driving support functions to be performed based on the detection result of the malfunctioning sensor is unable to operate properly. On the other hand, it is considered that one of the driving support functions to be executed based on the detection result of the sensors 20 other than the malfunctioning sensor is operating properly.

Therefore, the power supply control apparatus 1 uses whether any of the driving support functions other than one of the driving support functions using the malfunctioning sensor is inoperative or operative. This allows the power supply control apparatus 1 to perform power supply reset of the sensors 20 without affecting the performance of properly running driving support functions. The power supply control apparatus 1 can then attempt recovery of the malfunctioning sensor (initialized by restart of the sensors 20) by power supply reset. In this way, the power supply control apparatus 1 can suppress the effect on the driving support functions during the operation when the power supply reset of the plurality of sensors is performed.

Further, the power supply control apparatus 1 can perform the power supply reset of the plurality of sensors 20 based on at least one of the vehicle speed and the traveling direction of the vehicle in addition to whether any of the driving support functions other than one of the driving support functions using the malfunctioning sensor are inoperative or operative. Here, even if one of the driving support functions other than one of the driving support functions using the malfunctioning sensor is inoperative, it may not be appropriate to perform the power supply reset of the sensors 20.

For example, the sensors 20 may take time after a power supply reset before it can be properly detected. For example, it may take a long time to restart. For this reason, even if the sensors 20 are not currently used, one of the driving support functions to be executed may be switched due to a change in the traveling state of the vehicle, and their use may be immediately started. In such a case, if the sensors 20 are being restarted, it may occur that the newly initiated driving support function is not properly executed. Therefore, the power supply control unit 13 performs the power supply reset of the plurality of sensors 20 in consideration of at least one of the vehicle speed and the traveling direction of the vehicle. Thus, the power supply control unit 13 can collectively perform the power supply reset of the plurality of sensors 20 while suppressing an effect on any of the driving support functions which might be executed.

For example, the malfunctioning sensor is a sensor that detects a situation in front of the vehicle. The inoperative driving support function determined by the operation determination unit 12 is one of the driving support functions to be executed based on the situation behind the vehicle. In this case, the power supply control unit 13 performs a power supply reset of the plurality of sensors 20 when the vehicle is moving forward at a vehicle speed greater than or equal to a predetermined forward vehicle speed threshold.

Here, for example, when the vehicle is moving forward at a vehicle speed equal to or higher than a forward vehicle speed threshold, the vehicle cannot immediately move backward. That is, it is considered that any of the driving support functions to be executed based on the situation behind the vehicle (for example, the detection result of the rear camera) are not immediately executed. Therefore, the power supply control unit 13 performs power supply reset of the sensors 20 in the case of the type of malfunctioning sensor and the driving state of the vehicle described above. Thus, the power supply control unit 13 can collectively perform the power supply reset of the plurality of sensors 20 at an appropriate time which does not affect any of the driving support functions to be executed based on the rear situation. The plurality of sensors 20 includes a malfunctioning sensor that detects a forward situation and one of the sensors 20 used for one of the driving support functions that is performed based on a rearward situation.

Further, for example, the malfunctioning sensor is a sensor that detects a situation behind the vehicle. The inoperative driving support function determined by the operation determination unit 12 is one of the driving support functions to be performed based on the situation in front of the vehicle. In this case, the power supply control unit 13 executes the power supply reset of the plurality of sensors 20 when the vehicle is reversing at a vehicle speed equal to or greater than a predetermined reverse vehicle speed threshold.

Here, for example, when the vehicle is moving backward at a vehicle speed equal to or higher than a reverse vehicle speed threshold, the vehicle cannot immediately move forward. That is, it is considered that any of the driving support functions to be executed based on the situation in front of the vehicle are not immediately executed. Therefore, the power supply control unit 13 performs power supply reset of the sensors 20 in the case of the type of malfunctioning sensor and the driving state of the vehicle described above. Accordingly, the power supply control unit 13 can collectively perform the power supply reset of the plurality of sensors 20 at an appropriate time that does not affect any of the driving support functions to be executed based on the situation in front. The plurality of sensors 20 includes a malfunctioning sensor that detects a rear situation and one of the sensors 20 used for any of the driving support functions to be performed based on a front situation.

Although the embodiments of the present disclosure have been described above, the present disclosure is not limited to the above-described embodiments. For example, the types of driving support function and sensors 20 described above are examples, and are not limited to those described above.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A power supply control apparatus that performs power supply control of a plurality of sensors used in a driving support apparatus that performs each of a plurality of driving support functions for an autonomous vehicle based on at least one detection result of the plurality of sensors, the power supply control apparatus comprising:
   a malfunction determination unit configured to determine a malfunctioning sensor among the plurality of sensors, the malfunctioning sensor being a sensor whose detection is malfunctioning;
   an operation determination unit configured to determine whether any of the driving support functions other than one of the driving support functions using the malfunctioning sensor are inoperative in the driving support apparatus; and
   in response to the determination that any of the driving support functions other than the one of the driving support functions using the malfunctioning sensor are inoperative in the driving support apparatus, a power supply control unit is configured to perform a power supply reset of all of the plurality of sensors,
   in response to the determination that none of the driving support functions other than the one of the driving support functions using the malfunctioning sensor are inoperative in the driving support apparatus, the power supply control unit is configured to not to perform a power supply reset of any of the plurality of sensors.

2. The power supply control apparatus according to claim 1, wherein the power supply control unit performs the power supply reset of all of the plurality of sensors based on at least one of a vehicle speed and a traveling direction of the vehicle in addition to whether any of the driving support functions other than one of the driving support functions using the malfunctioning sensor are inoperative or operative.

3. The power supply control apparatus according to claim 2, wherein the power supply control unit performs the power supply reset of all of the plurality of sensors when the malfunctioning sensor is one of the plurality of sensors that detects a situation in front of the vehicle, one of the inoperative driving support functions determined by the operation determination unit is one of the driving support functions to be performed based on a situation behind the vehicle, and the vehicle is moving forward at a vehicle speed greater than or equal to a predetermined forward vehicle speed threshold.

4. The power supply control apparatus according to claim 2, wherein the power supply control unit performs the power supply reset of all of the plurality of sensors when the malfunctioning sensor is one of the plurality of sensors that detects a situation behind the vehicle, one of the inoperative driving support functions determined by the operation determination unit is one of the driving support functions to be performed based on a situation in front of the vehicle, and the vehicle is moving backward at a vehicle speed greater than or equal to a predetermined reverse vehicle speed threshold.

* * * * *